United States Patent Office 3,508,525
Patented Apr. 28, 1970

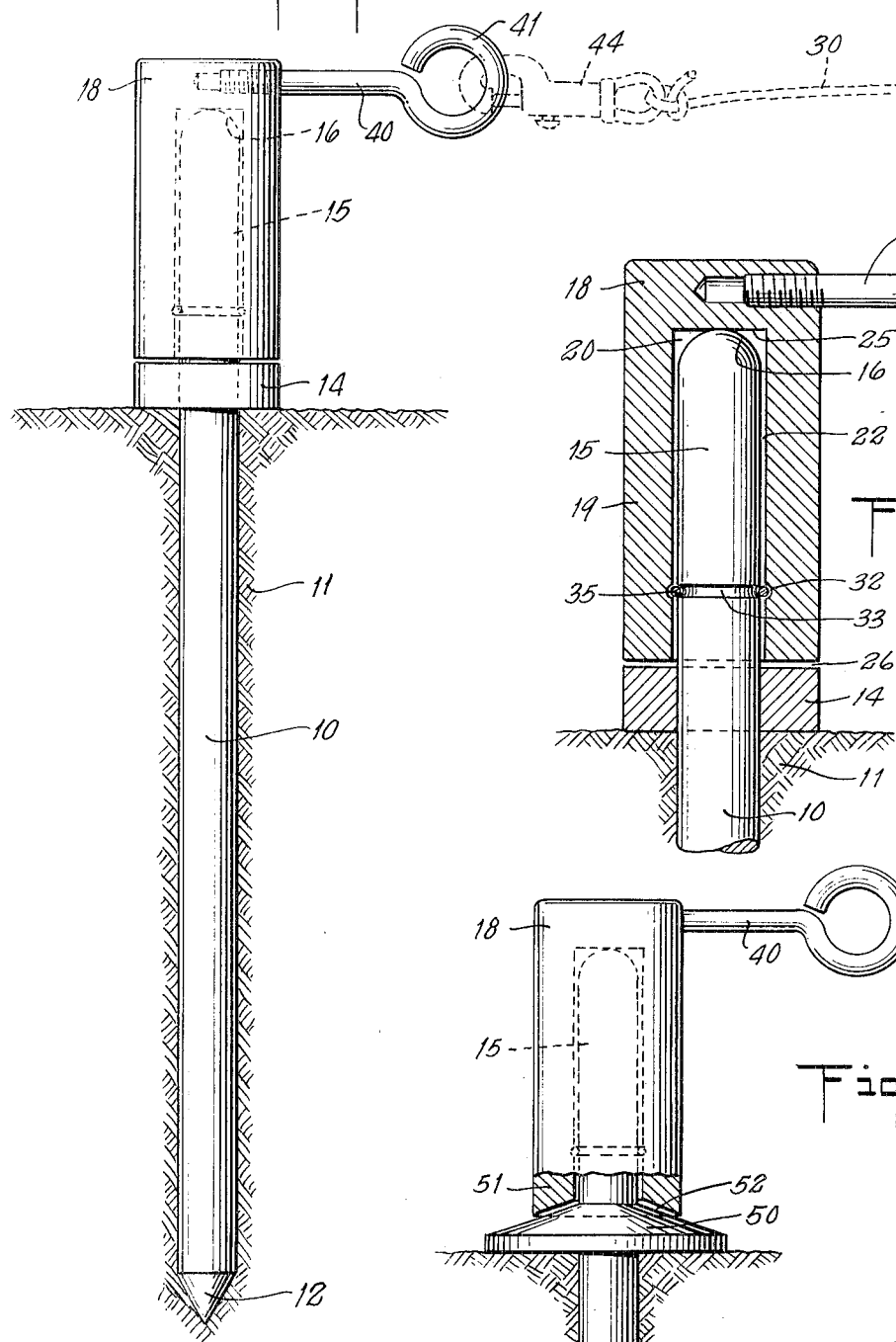

3,508,525
TETHERING DEVICE
Frank L. Sawyer, P.O. Box 365, Wells, Maine 04090
Filed Dec. 7, 1967, Ser. No. 688,953
Int. Cl. A01k *3/00*
U.S. Cl. 119—117
6 Claims

ABSTRACT OF THE DISCLOSURE

An animal tethering device which has a stake for insertion in the ground, a collar of enlarged diameter attached to such stake which, among other things, serves to limit the degree of penetration into the ground, an extension above the collar which is loosely engaged by a cylindrical head having a sleeve portion surrounding such extension, the upper end of the extension being rounded to provide virtually a point contact with the upper flat interior surface of such head, the head being in substantially frictionless contact with said extension, the lower surface of the head spaced slightly from the upper face of the collar with the space therebetween smaller than the diameter of the tether line or chain, but large enough to avoid friction and the head having near its top a laterally projecting eye-bolt for attachment of the tether.

---

The present invention relates to a tethering device for animals. More particularly, it relates to an animal tethering device which has a stake to be inserted into the ground or to be suitably anchored to the ground, and which has on top of the stake a revolving head to which a tether may be attached.

Tethering devices for animals are well known and there are numerous forms of such devices.

Among the principal problems sought to be solved in the design of tethering devices is to so arrange the device that the tether line or chain will not remain wound around the device as the animal goes around and around, with the result that the line or chain becomes progressively shorter and the animal's grazing, play or exercise area becomes smaller and smaller.

A second problem with tethering devices is that the line or chain sometimes becomes wedged between relatively moving parts of the device and creates a "bind" which prevents further rotation of the device.

A third problem with tethering devices is that the line or chain cannot readily slip over the top of the device as the animal moves from one side to the other.

Finally, in many tethering devices, which are of necessity staked in the ground and are exposed to dirt and other foreign matter, the revolving head for the device cannot be maintained readily rotatable for any appreciable period of time.

It is an object of the present invention to provide a tethering device for animals which overcomes all of the foregoing problems. It is also an object of the invention to provide such a tethering device which is of simple construction and inexpensive to manufacture.

In accomplishing these objects the present invention provides a stake for insertion in or attachment to the ground, with a collar of enlarged diameter attached to such stake and which, among other things, serves to limit the degree of penetration into the ground, the stake having an extension above such collar which is loosely engaged by a cylindrical head having a sleeve portion surrounding such extension, the upper end of the extension being rounded to provide virtually a point contact with the upper flat interior surface of such head, whereby said head is in substantially frictionless contact with said extension, said head and extension being so dimensioned that the lower surface of the head is spaced slightly from the upper face of the collar with the space therebetween being smaller than the diameter of the tether line or chain, but large enough to eliminate friction said head and extension being maintained in assembled relation by slip-retaining means, and said head having rigidly secured near its top a laterally projecting eye-bolt or the like for attachment of the tether line or chain, such eye-bolt or attaching means being so mounted that the line or chain can readily slip over the top of the head when the animal moves around or from one side to the other of said device—the entire combination providing the most unexpected result that as the animal goes around and around the stake and then reverses its direction to provide a series of loose loops, such loops unwind completely when the animal renders the entire tether line taut.

Referring now to the drawings wherein the preferred forms of the invention are shown:

FIGURE 1 is an elevational view of the device positioned in the ground, with the tether line and snap hook shown in phantom;

FIG. 2 is an axial sectional view of the device of FIG. 1, with a fragmentary showing of the stake; and FIG. 3 is an elevation partly in section of a modified form of the device shown in FIG. 1.

In the drawings 10 is a spiked stake for insertion in the ground 11, such stake having a pointed end 12 to facilitate such insertion. A collar 14 of larger diameter than the stake 10 is integral with such stake and, among other things, serves to limit the degree of penetration of the stake when its underface makes contact with the surface of the ground.

The stake 10 has an extension member 15 which for convenience in manufacture may be of the same diameter as the stake.

The upper end 16 of the extension member 15 is rounded on a radius which approximates the radius of such extension member in a transverse plane.

A cylindrical head 18 having a sleeve portion 19 and an internal bore 20 is loosely fitted over the extension member 15 so as to be freely rotatable thereon. It will be noted from the drawings that there is a clearance 22 between the sleeve portion 19 of the cylindrical head 18 and the extension member 15 to permit of such free rotation. It will also be noted that the upper end of the bore 20 is provided with a flat surface 25 which virtually makes a point contact with the rounded upper end 16 of the extension member 15. It will also be noted that the axial dimension of the bore 20 is slightly less than the axial dimension of the extension member 15 so as to provide a small clearance 26 between the lower end of the sleeve 19 and the upper surface of the collar 14. This clearance is made large enough to permit of rotation of the head 18 on the extension member 15 free of friction with the collar 14. The clearance is also dimensionally made small enough that it is less than the thickness of the tether line 30 so that such line cannot become wedged or bound between such rotatable head 18 and the fixed collar 14.

In order to maintain that head 18 in assembly with the extension member 15 a groove 32 is provided in the sleeve portion of the head 18, and a complemental groove 33 is provided in the extension member 15. A snap ring 35 engages in both of said grooves and thus maintains the head 18 and the extension member 15 in assembled relation so as to prevent separation of the two without giving rise to any appreciable friction during rotation of the head 18.

With this assembly of parts it has been found that the head 18 which only has virtually a point contact with the top 16 of the extension member 15 can rotate about such extension member with negligible friction.

As an alternative to the snap ring 35 a set screw threaded through the sleeve 19 may be used to engage in the slightly enlarged groove 33 in the extension member 15 so as to maintain the head and extension member in assembled relation while giving rise to minimum of friction when the head rotates.

An eye bolt 40 is screw threaded laterally into the upper end of the head 18 and rigidly retained therewith. The eye 41 of such bolt provides a ready means for attaching a snap hook 44 at the end of the tether 30 to which the animal is attached.

The eye bolt 40 is purposely secured laterally to the head 18 at its upper end. By projecting laterally as shown, as the animal moves around the stake 10 the lateral pull will cause the head 18 to rotate freely on the extension member 15. In this way the tether 30 does not wind up around the head 18 so as progressively to shorten the tether. Furthermore, and most importantly, it has been found with this tethering device that when the animal pursues its natural habits and walks around and around the stake making loose loops and then sometimes reverses its direction and makes opposite loose loops, when the tether is eventually pulled taut around the head, the head will revolve and all of such loops unwind freely, as there is no place above or below the revolving head 18 where such tether can be solidly or immovably wrapped. In addition, it has been round that with the eye bolt 40 in close proximity to the upper end of the head 18 the tether 30 will slide across the top of such head when the animal goes from one side of the tethering device to the other.

With the present invention which is intended to be inserted in the ground, and hence in close contact with dirt, dust, grass clippings, dried leaves and the like, it has been found that there is little if any opportunity for such dirt or other debris to enter between the cylindrical head 18 and the extension member 15 to such extent as to interfere with its virtually frictionless rotation.

In FIG. 3 of the drawings there is illustrated a slightly modified form of the invention shown in FIGS. 1 and 2. The only difference is that an enlarged conical collar 50 is provided instead of the cylindrical collar 14; and that the lower end 51 of the head 18 has a complemental inner conical shape so as to provide clearance 52 similar to clearance 26. It has been found that such enlarged conical collar 50, which has a larger soil engaging undersurface is of advantage under some conditions, and that the downwardly sloping celarance 52 is of further assistance not only in preventing the entrance of dirt, dust or debris between the rotatable head 18 and the non-rotatable collar 15, but also causes such debris to be discharged. Coincidentally it has been found that such downwardly sloping collar 50 assists in the unwinding action of the tether when the loose loops are rendered taut.

As will be evident to those skilled in the art, the present invention permits of various modifications without departing from the spirit thereof.

What I claim is:

1. A tethering device for staking out an animal comprising a stake member for engagement with the ground, a collar on said stake for positioning said stake with respect to the ground, a cylindrical extension on said stake member integrally connected with said collar, said extension member having an upper rounded end, a head member including a cylindrical sleeve portion disposed over said extension member, said head member having an internal bore of slightly larger diameter than said extension member and having a flat surface at its upper inner end for engagement with said rounded end of said extension member, said sleeve member being of slightly less internal length than the extension member and providing with said collar a clearance therebetween of less thickness that a tether line, and an attaching member on said head for connection with a tether.

2. A tethering device according to claim 1, wherein said attaching member projects laterally from the upper end of said head.

3. A tethering device according to claim 1, wherein said attaching member is an eye-bolt projecting laterally from the upper end of said head.

4. A tethering device according to claim 1, wherein said stake member is pointed for ready insertion in the ground up to the underface of said collar.

5. A tethering device according to claim 4, wherein said collar has a conical upper surface and the lower end of said sleeve member is complementally tapered.

6. A tethering device according to claim 1, wherein a groove is provided in said extension member, and locking means cooperating with said groove are provided for maintaining said head member and extension member in substantially frictionless assembled relation.

References Cited

UNITED STATES PATENTS

| | | | |
|---|---|---|---|
| 70,899 | 11/1867 | Rawsor | 110—117 |
| 722,531 | 3/1903 | McGoron | 119—121 |
| 1,579,294 | 4/1926 | Fisk | 273—200 |
| 2,472,926 | 6/1949 | Sullivan | 119—121 |

HUGH R. CHAMBLEE, Primary Examiner